3,154,596
METHOD FOR ALKYLATION OF
ISOPARAFFINS
Charanjit Rai, John B. Braunwarth, and Robert C. Kimble, Crystal Lake, Ill., assignors to The Pure Oil Company, Chicago, Ill., a corporation of Ohio
No Drawing. Filed Dec. 31, 1962, Ser. No. 248,237
9 Claims. (Cl. 260—683.63)

The present invention relates to the treatment of hydrocarbons and refers to the manufacture of saturated hydrocarbons of the branched chain type, especially suitable for use as fuel in automobile and aviation engines. In a more particular aspect, the invention relates to a process for the reaction of isoparaffinic hydrocarbons of relatively low molecular weight with olefinic hydrocarbons to produce branched-chain paraffinic hydrocarbons of higher molecular weights within the gasoline boiling range. These products are of particular value as motor fuels or constituents of motor fuels in that they possess high anti-knock quality. The invention further resides in the use of a particular catalyst for the conversion of isobutane and butene-1 to iso-octane.

The prior art teaches that gasoline-boiling-range, branched-chain paraffins having high anti-knock quality can be produced by alkylating iso-paraffinic hydrocarbons with olefins. This alkylation reaction has been found to occur when the iso-paraffinic hydrocarbons are brought into contact with the olefins in the presence of an alkylation catalyst, such as sulphuric acid, at ambient temperatures in liquid phase. The reaction is termed alkylation and the product called alkylate, as distinguished from polymer gasolines produced by the co-reaction of two or more olefins.

The above-described alkylation reaction can be carried out by reacting the iso-paraffinic and olefinic hydrocarbons in the presence of suitable alkylating catalysts, such as sulfuric acid, and particularly strong sulfuric acid. The stronger sulfuric acid catalysts, maintaining other conditions equal, increase the yields of the desirable branched-chain paraffinic hydrocarbons boiling within the gasoline range. The use of these stronger acid catalysts further decreases the production of polymers outside of the gasoline range. However, sulfuric acids of these higher strengths, when brought into contact with the described hydrocarbons, tend to react therewith to produce certain undesirable products with the incidental formation of sulfur dioxide, carbonization products, and some water. The formation of water is undesirable in that it dilutes the sulfuric acid catalysts and unites with the sulfuric acid molecules to produce monohydrates.

The prior art has suggested the addition of various acids and salts to a concentrated sulfuric acid to enhance its catalytic properties, or minimize undesired side reactions. The prior art further teaches controlling the proportions of iso-paraffin and olefin in the feed, a major portion of the paraffin being employed, to suppress polymerization reactions and increase the selectivity for alkylation.

It has now been found that improved selectivity for the production of gasoline-boiling-range alkylation products is obtained by incorporating in the sulfuric acid catalyst a small but effective amount of hemisodium phosphate. It is, therefore, a principal object of the present invention to provide an alkylation process of improved selectivity for gasoline-boiling-range alkylate. It is another object of the present invention to provide a process of the character described which will permit the use of relatively strong sulfuric acid without loss of selectivity due to concurrent side reactions.

The term "paraffinic hydrocarbons" employed in the present specification and claims relates to lower iso-paraffinic members, namely, isobutane, isopentane, and isohexanes. The rates of alkylation of these hydrocarbons, maintaining other conditions equal, are not the same. Thus, the rate of alkylate formation when isopentane is employed is considerably slower than the rate of alkylation when isobutane is used. The term "olefinic hydrocarbons," as used herein, relates both to the normally gaseous and the normally liquid olefins which comprise hydrocarbons such as propenes, butenes, and pentenes. It is to be noted that it is not desirable to employ very-high-boiling olefins since the alkylation reactions more fully described hereinafter become unfavorable for the production of gasoline-boiling-range hydrocarbons.

The process of this invention is carried out by bringing together an iso-paraffinic hydrocarbon and an olefinic hydrocarbon, as aforedescribed, in the presence of a catalytic agent comprising a sulfuric acid alkylation catalyst in which has been incorporated 2% to 15% by weight of hemisodium phosphate, based upon the total weight of the mixture of acid and hemisodium phosphate. Thus, the inevntion may be stated to reside broadly in reacting an iso-paraffinic hydrocarbon, such as isobutane, with an olefinic hydrocarbon, such as butene-1, in the presence of the novel catalytic mixture aforedescribed. The novel catalytic material may be prepared by mixing 2% to 15% of hemisodium phosphate in a conventional prior art sulfuric acid alkylation catalyst, which may be technical grade concentrated sulfuric acid. Best results are obtained using sulfuric acid of 90% to 100% concentration, and preferably 98% to 100% concentration. The hemisodium phosphate is preferably incorporated in the sulfuric acid in the amount of about 10% by weight of the sulfuric acid-hemisodium phosphate mixture. In addition to the hemisodium phosphate, the mixture can contain other constituents, especially polyphosphoric acid in the amount of about 5% of the mixture.

The alkylation reaction may be carried out at temperatures in the range of 0° to 100° F., and most conveniently is carried out at ambient temperatures. The reaction pressure may be atmospheric where the temperature is below the boiling point of the reactants at atmospheric pressure. Low super-atmospheric pressures, sufficient to maintain the reactants in the liquid phase at reaction temperature, will usually be necessary. Specific temperatures and pressures are not critical to the improvement achieved in accordance with the method of this invention.

The molar ratio of the paraffin and olefin reactants is not critical, but it is preferred to use molar ratios in the range of 3–4 to 1 to increase the selectivity for alkylation and suppress polymerization reactions. The quantity of catalyst employed is not critical and may be in accordance with the teachings of the prior art.

*Example 1*

A 300 ml., 3-necked, round bottom flask was equipped with a mechanical stirrer, a Dry Ice condenser, and a constant-pressure dropping funnel. With the temperature of the flask maintained at below 23° F., 80.7 g. of isobutane and 25 g. of butene-1 were added to the flask. Twenty grams of hemisodium phosphate and 180 g. of concentrated sulfuric acid were added with stirring. The reaction continued at −8° C. and with stirring for 3 hours, after which the reaction mixture was allowed to warm to room temperature. Phases were separated and the alkylate phase was water-washed, dried, and distilled.

Three fractions were collected:

1BP–350° F. (Gasoline Fraction)
    350° F.–420° F. (Naphtha Fraction)
    Residue (Bottoms)

The results are listed in the table below:

Examples II–VIII

Comparable experiments were run in which sulfuric acid alone and sulfuric acid in combination with various acids and salts were used as catalysts. The data tabulated below indicate that the novel catalyst of this invention is superior to the catalysts of Examples II to VI. Examples II to VIII were conducted as described with respect to Example I.

| Example | Catalyst | Total Alkylate (w. percent of Butene-1 charged) | Fractions (w. percent of Total Alkylate) | | | Loss (w. percent) |
|---|---|---|---|---|---|---|
| | | | Gasoline | Naphtha | Bottoms | |
| 1 | 90% $H_2SO_4$[1]; 10% $H_3PO_4.NaH_2PO_4$. | 176 | 83.0 | 5.8 | 8.0 | 3.2 |
| 2 | 100% $H_2SO_4$[1] | 177 | 70.0 | 8.7 | 6.5 | 14.8 |
| 3 | 90% $H_2SO_4$[1]; 5% PPA; 5% $H_3PO_4.NaH_2PO_4$. | 178 | 74.0 | 12.6 | 5.5 | 7.9 |
| 4 | 100% $H_3PO_4.NaH_2PO_4$ | | ([2]) | ([2]) | ([2]) | ([2]) |
| 5 | 90% $H_2SO_4$[1]; 10% $H_3PO_4$ | 131 | 80.5 | 1.9 | 5.3 | 12.3 |
| 6 | 90% $H_2SO_4$; 10% Cupric Phosphate. | 153.8 | 72.0 | 13.1 | 7.3 | 7.6 |
| 7 | 97% $H_2SO_4$; 3% Zinc Phosphate. | 157.7 | 73.3 | 14.9 | 8.9 | 2.9 |
| 8 | 90% $H_2SO_4$; 10% Zinc Phosphate. | 149.6 | 70.9 | 14.6 | 10.6 | 3.9 |

[1] 98% Strength Technical $H_2SO_4$.
[2] No reaction.

The polyphosphoric acid used is a liquid mixture of polymeric phosphorus acids having a $P_2O_5$ content of about 72 to 90% by weight and preferably about 82 to 84% by weight. This acid, its properties and preparation are described in the prior art, e.g. United States Patent 2,999,010 by M. M. Striplin, Jr., which describes polyphosphoric acid as having a concentration between that of 100 percent $H_3PO_4$ (72.4 percent $P_2O_5$) and pyrophosphoric acid (79.8 percent $P_2O_5$). The polyphosphoric acid is a mixture of orthophosphoric acid with metal-, pyro-, and other polyphosphoric acids in proportions that vary with concentration.

In carrying out the invention, the apparatus used and the conditions of operation with respect to temperature, pressure, proportions of reacting constituents, etc., can be varied to suit the individual cases. Thus, although alkylation reactions described herein are realized at low temperatures, it will ordinarily be preferred to carry out the reactions at higher ambient temperatures.

The embodiments of the invention in which an exclusive property or privilege is claimed are defined as follows:

1. In the liquid phase alkylation of an iso-paraffinic hydrocarbon with an olefinic hydrocarbon at a temperature in the range of 0° to 100° F. to produce a gasoline-boiling-range product, the improvement comprising conducting said alkylation in the presence of a sulfuric acid catalyst in which is incorporated 2% to 15% by weight of hemisodium phosphate, based on the weight of the mixture.

2. The method in accordance with claim 1 in which the catalyst consists of 90% to 90% weight percent sulfuric acid, 5% hemisodium phosphate and 5% polyphosphoric acid, based on the weight of the mixture.

3. The method in accordance with claim 1 in which the catalyst consists essentially of sulfuric acid of 90% to 100% concentration in which is incorporated 2 to 15% by weight of hemisodium phosphate, based on the weight of the mixture.

4. The method in accordance with claim 1 in which the catalyst consists essentially of sulfuric acid of about 98% concentration and the hemisodium phosphate is incorporated in the amount of about 10% by weight of the mixture.

5. The method in accordance with claim 4 in which the iso-paraffinic hydrocarbon is isobutane and the olefinic hydrocarbon is butene-1.

6. The method in accordance with claim 5 in which the isobutane and butene-1 are reacted in the ratio of about three to four moles of isobutane to one mole of butene-1.

7. In the liquid phase alkylation of isoparaffinic hydrocarbons with olefinic hydrocarbons in the presence of a sulfuric acid catalyst, the improvement comprising conducting the alkylation reaction in the presence of sulfuric acid containing 2–15% by weight of hemisodium phosphate, based on the total weight of the acid and phosphate.

8. The improvement in accordance with claim 7 in which the concentration of the sulfuric acid is 98 to 100% and the hemisodium phosphate is present in an amount of about 10% by weight, based on the total weight of the acid and phosphate.

9. The improvement in accordance with claim 8 in which the molal ratio of isoparaffinic hydrocarbons to olefinic hydrocarbons in the mixture undergoing alkylation is 3–4 of the former to 1 of the latter and the alkylation temperature is in the range of 0–100° F.

References Cited in the file of this patent

UNITED STATES PATENTS

| | | |
|---|---|---|
| 2,381,041 | De Jong | Aug. 7, 1945 |
| 2,435,028 | Bradley | Jan. 27, 1948 |
| 2,701,184 | Rupp | Feb. 1, 1955 |

UNITED STATES PATENT OFFICE
CERTIFICATE OF CORRECTION

Patent No. 3,154,596　　　　　　　　　　　　October 27, 1964

Charanjit Rai et al.

It is hereby certified that error appears in the above numbered patent requiring correction and that the said Letters Patent should read as corrected below.

Column 2, line 24, for "inevntion" read -- invention --; column 3, line 41, for "metal-" read -- meta- --; column 4, line 2, for "to 90%" read -- of 98 --.

Signed and sealed this 23rd day of March 1965.

(SEAL)
Attest:

ERNEST W. SWIDER　　　　　　　　　　　　EDWARD J. BRENNER
Attesting Officer　　　　　　　　　　　　Commissioner of Patents